(12) United States Patent
Akkermans

(10) Patent No.: US 7,656,758 B2
(45) Date of Patent: Feb. 2, 2010

(54) DEVICE FOR PLAYING OPTICAL DISCS

(75) Inventor: Antonius Hermanus Maria Akkermans, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 410 days.

(21) Appl. No.: 10/540,697

(22) PCT Filed: Dec. 3, 2003

(86) PCT No.: PCT/IB03/05770

§ 371 (c)(1),
(2), (4) Date: Jun. 24, 2005

(87) PCT Pub. No.: WO2004/059625

PCT Pub. Date: Jul. 15, 2004

(65) Prior Publication Data

US 2006/0104167 A1    May 18, 2006

(30) Foreign Application Priority Data

Dec. 30, 2002    (EP) .................................. 02080541

(51) Int. Cl.
*G11B 7/00*    (2006.01)

(52) U.S. Cl. .............. 369/44.28; 369/44.29; 369/44.32

(58) Field of Classification Search .............. 369/44.25, 369/32, 26, 284, 44.11, 44.29, 44.35, 44.41
See application file for complete search history.

(56) References Cited

U.S. PATENT DOCUMENTS

| 5,157,642 A | * | 10/1992 | Tsukamura et al. ...... 369/30.15 |
| 5,442,604 A | * | 8/1995 | Osada ..................... 369/44.11 |
| 5,539,710 A | * | 7/1996 | Tokushuku et al. ......... 369/126 |
| 5,872,676 A | * | 2/1999 | Smith et al. .............. 360/77.03 |

FOREIGN PATENT DOCUMENTS

| EP | 862169 A1 | * | 9/1998 |
| EP | 938038 A2 | * | 8/1999 |
| EP | 0938038 A2 | * | 8/1999 |
| NL | EP0862169 A1 | * | 9/1998 |
| NL | EP0938038 A2 | * | 8/1999 |

* cited by examiner

*Primary Examiner*—Wayne R Young
*Assistant Examiner*—Lixi Chow

(57) ABSTRACT

A disc drive apparatus (1) for optical discs (2) comprises: a frame (3); a sledge (10) displaceably mounted with respect to said frame (3); a lens actuator (43, 21) displaceably mounted with respect to said sledge (10); and a control unit (90) for generating a control signal ($S_{CL}$) for the lens actuator (43, 21). The control unit (90) is designed, during a jump operation, to generate said control signal ($S_{CL}$) for the lens actuator (43, 21) on the basis of an actuator deviation signal ($S_{AS}$) representing a difference between actuator position ($X_A$) and sledge position ($X_S$).

12 Claims, 7 Drawing Sheets

DEVICE FOR PLAYING OPTICAL DISCS

The present invention relates in general to a disc drive apparatus for writing/reading information into/from an optical storage disc; hereinafter, such disc drive apparatus will also be indicated as "optical disc drive".

As is commonly known, an optical storage disc comprises at least one track, either in the form of a continuous spiral or in the form of multiple concentric circles, of storage space where information may be stored in the form of a data pattern. Optical discs may be read-only type, where information is recorded during manufacture, which information can only be read by a user. The optical storage disc may also be a writable type, where information may be stored by a user. For writing information in the storage space of the optical storage disc, or for reading information from the disc, an optical disc drive comprises, on the one hand, rotating means for receiving and rotating an optical disc, and on the other hand optical means for generating an optical beam, typically a laser beam, and for scanning the storage track with said laser beam. Since the technology of optical discs in general, the way in which information can be stored in an optical disc, and the way in which optical data can be read from an optical disc, is commonly known, it is not necessary here to describe this technology in more detail.

For rotating the optical disc, an optical disc drive typically comprises a motor, which drives a turntable engaging a central portion of the optical disc. Usually, the motor is implemented as a spindle motor, and the motor-driven turntable may be arranged directly on the spindle axle of the motor.

For optically scanning the rotating disc, an optical disc drive comprises a light beam generator device (typically a laser diode), an objective lens for focussing the light beam in a focal spot on the disc, and an optical detector for receiving the reflected light reflected from the disc and for generating an electrical detector output signal.

During operation, the light beam should remain focussed on the disc. To this end, the objective lens is arranged axially displaceable, and the optical disc drive comprises focal actuator means for controlling the axial position of the objective lens. Further, the focal spot should remain aligned with a track or should be capable of being positioned with respect to a new track. To this end, at least the objective lens is mounted radially displaceable, and the optical disc drive comprises radial actuator means for controlling the radial position of the objective lens.

More particularly, the optical disc drive comprises a sledge which is displaceably guided with respect to a disc drive frame, which frame also carries the spindle motor for rotating the disc. The travel course of the sledge is arranged substantially radially with respect to the disc, and the sledge can be displaced over a range substantially corresponding to the range from inner track radius to outer track radius. Said radial actuator means comprise a controllable sledge drive, for instance comprising a linear motor, a stepper motor, or a worm gear motor.

The displacement of the sledge is intended for roughly positioning the objective lens. For fine-tuning the position of the objective lens, the objective lens is displaceably mounted with respect to said sledge, and the optical disc drive comprises a lens actuator for displacing the objective lens with respect to said sledge. The design can be of a type wherein the objective lens follows a substantially straight line of displacement with respect to the sledge, or of a pivoting type, wherein the objective lens follows a curved line of displacement with respect to the sledge. The displacement range of the objective lens with respect to the sledge is relatively small, but the positioning accuracy of the objective lens with respect to the sledge is larger than the positioning accuracy of the sledge with respect to the frame.

In the following, the objective lens and the actuator will be considered as an integral whole, and a displacement of the objective lens with respect to the sledge will simply be indicated as a displacement of the lens actuator. Further, unless specifically mentioned otherwise, the wording "the actuator" will indicate the lens actuator.

Normally, just following the track of the rotating disc only requires relatively low radial velocities. However, sometimes a jump to another track is required. An important characteristic feature of a disc drive is the access time, i.e. the average time needed to reach a desired location on disc. Herein, a great role is played by the time needed to complete a jump to the target track. Therefore, jumps are associated with relatively large radial velocities and, as a consequence, with relatively large radial accelerations.

A problem in this respect, associated with large accelerations, is the fact that the actuator has a certain mass inertia. On acceleration of the sledge, the actuator tends to stay behind; on deceleration of the sledge, the actuator tends to shoot ahead. Further, the actuator tends to resonate, especially when the sledge accelerates or comes to a standstill.

In order to mitigate these problems, it is already known to dampen the resonance of the actuator. Further, when a jump is about to be made, it is already known to provide the actuator control with the sledge control signal. This is indicated as a feed-forward control.

In the prior art, damping is effected only with reference to the disc. To this end, the photo-detector output signal is analyzed to derive information with respect to track-crossings, and the number of tracks crossed per unit time is monitored. This information is compared with the sledge control signal, and deviations are counter-acted by the actuator.

This type of control requires a calculating step, wherein the number of track-crossings as counted is compared with the number of track-crossings as expected. Further, in cases where the track crossing signal is absent, or contains relatively much noise, it may be difficult to achieve reliable and robust control on the basis of counting track-crossings alone. For instance, if the track crossing signal contains a lot of noise, it may happen that erroneous track crossings are detected.

An important objective of the present invention is to provide an improved actuator control which allows faster access, especially in cases with an unreliable or noisy track crossing signal.

According to one aspect of the present invention, during a jump, the actuator control signal is generated while taking reference to the sledge itself. Then, without the calculations of track-counting, it will be possible to force the actuator to more accurately follow the movement of the sledge during jumps.

It is of course possible to provide a separate detector for detecting movement of the actuator with respect to the frame, and to compare the actuator position thus detected with the sledge control signal. However, in a preferred embodiment of the present invention, a measuring signal directly proportional to the difference between sledge position and actuator position is derived from the output signal of the optical detector. A preferred example of such measuring signal is the DC level of the one-spot push-pull signal.

Thus, according to an important aspect of the present invention, in a disc drive according to the present invention, an actuator drive system is adapted to receive the one-spot push-pull signal, to perform a low-pass filter operation on this signal, and to take this low-pass filtered signal into account when generating a control signal for the actuator.

As mentioned, the shape of the tracks is, in practice, not perfectly circular with respect to the rotational axis of the disc. This may be caused by the fact that the tracks themselves do not have an ideal spiral shape or circular shape, or by the fact that the centre hole of the disc is not exactly centred, or by the fact that there is some play between centre hole and turntable. In a tracking mode, i.e. when the actuator is controlled to follow a track, the actuator will constantly be moved to stay on track (i.e. the deviation between actuator position and track position is controlled to always be zero). If the actuator would be held perfectly still, the tracks would shift with respect to the actuator, and the actuator has lost track (i.e. the deviation between actuator position and track position varies constantly).

In an access mode, the sledge is controlled to jump to another track, wherein the jump distance is based on the calculated distance between present track and target track. If the actuator would be rigidly fixed to the sledge, indeed, by the time the sledge arrives with the actuator at the calculated position of the target track, the actual position of the target track has shifted. The result is that after the jump, the system finds itself on the wrong track, and a new jump (retry) is necessary to the target track. This, of course, adds to the access time, and should be avoided as much as possible.

Therefore, in order to take into account possible mechanical aberrations and eccentricity of the disc, the present invention proposes to provide the actuator with a shape memory, containing information on the shape of the disc and/or the tracks. It may prove sufficient if only the eccentricity of the disc is recorded.

In practice, whenever a new disc is introduced into the disc drive, the disc drive will perform a shape test on the disc or tracks, wherein during at least one disc revolution the shape of a track is measured, and the results are stored in the memory.

Then, when performing a jump, the actuator control takes into account the shape information recorded in said memory, by giving the actuator a position correction with respect to the sledge position, corresponding to the track shape and/or eccentricity.

These and other aspects, features and advantages of the present invention will be further explained by the following description of a preferred embodiment of an optical disk system according to the present invention with reference to the drawings, in which same reference numerals indicate same or similar parts, and in which:

FIG. 1 schematically shows a functional block diagram of an optical disk player or recorder;

FIG. 2 schematically illustrates a radial jump;

Hereinafter, the present invention will specifically be explained for the case of an optical disc drive for reading information from an optical disc. However, the present invention is equally applicable to an optical disc drive for writing information into a recordable optical disc.

Figure 1:
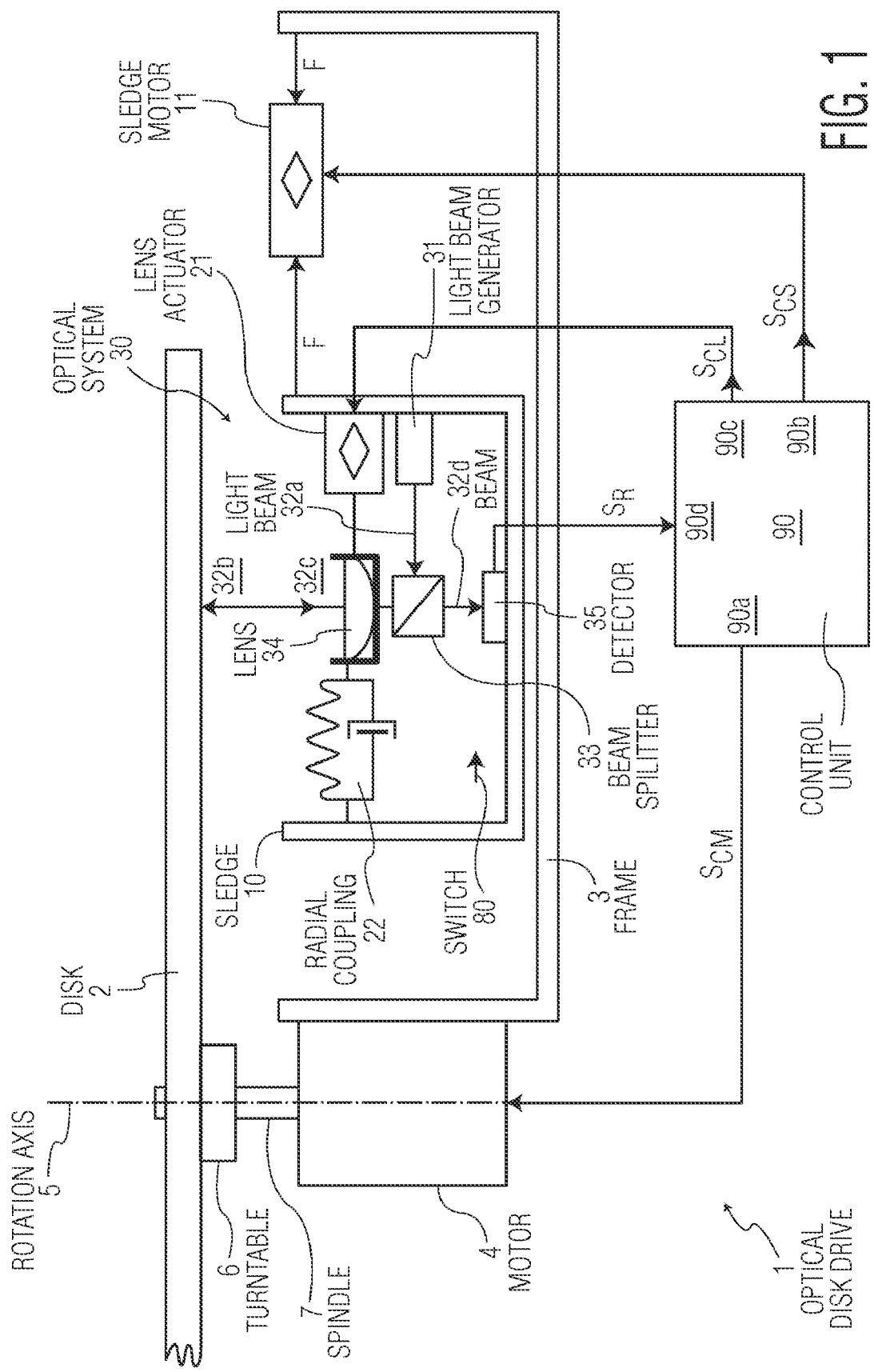

FIG. 1 schematically illustrates an optical disc drive 1, suitable for storing information on or reading information from an optical disc 2. The disc drive apparatus 1 comprises an apparatus frame 3. For rotating the disc 2, the disc drive apparatus 1 comprises a motor 4 fixed to the frame 3, defining a rotation axis 5. For receiving and holding the disc 2, the disc drive apparatus 1 may comprise a turntable 6, which in the case of a spindle motor 4 is mounted on the spindle 7 of the motor 4.

The disc drive apparatus 1 further comprises a displaceable sledge 10, which is displaceably guided in the radial direction of the disc 2, i.e. in a direction substantially perpendicular to the rotation axis 5, by guiding means not shown for the sake of clarity. A sledge motor, designed for regulating the coarse radial position of the sledge 10 with respect to the apparatus frame 3, is schematically indicated at 11. The force exerted by this sledge motor 11 is schematically indicated as arrows F. Since sledge motors are known per se, while the present invention does not relate to the design and functioning of such sledge motor, it is not necessary here to discuss the design and functioning of a sledge motor in great detail.

The disc drive apparatus 1 further comprises an optical system 30 for scanning tracks (not shown) of the disc 2 by an optical beam. More specifically, the optical system 30 comprises a light beam generating means 31, typically a laser such as a laser diode, which may be mounted with respect to the apparatus frame 3 or the sledge 10, and which is arranged to generate a light beam 32a which passes a beam splitter 33 and an objective lens 34. The objective lens 34 focuses the light beam 32b on the disc 2. The light beam 32b reflects from the disc 2 (reflected light beam 32c) and passes the objective lens 34 and the beam splitter 33 (beam 32d) to reach an optical detector 35, which may be mounted with respect to the apparatus frame 3 or the sledge 10. The optical detector 35 produces a read signal $S_R$.

With respect to the sledge 10, the objective lens 34 is displaceable in the radial direction of the disc 2. A radial lens actuator, arranged for radially displacing the lens 34 with respect to the sledge 10, is indicated at 21. Since such actuators are known per se, while further the design and operation of such actuator is no subject of the present invention, it is not necessary here to discuss the design and operation of such actuator in great detail. It is noted, however, that the actuator 21 constitutes a radial coupling between the lens 34 and the sledge 10, which coupling has characteristics of elasticity, stiffness and damping, as is shown schematically at 22.

It is noted that the disc drive apparatus 1 also comprises focus servo means arranged for axially displacing the lens 34 in order to achieve and maintain focusing of the light beam 32b exactly on the desired location of the disc 2, but such focus servo means are not illustrated in FIG. 1 for sake of clarity.

The disc drive apparatus 1 further comprises a control unit 90 having a first output 90a connected to a control input of the disc motor 4, having a second output 90b coupled to a control input of the sledge motor 11, and having a third output 90c coupled to a control input of the lens actuator 21. The control unit 90 is designed to generate at its first output 90a a control signal $S_{CM}$ for the disc motor 4, to generate at its second control output 90b a control signal $S_{CS}$ for the sledge motor 11 in order to control said force F, and to generate at its third control output 90c a control signal $S_{CL}$ for the lens actuator 21.

In the following, the objective lens 34 and the actuator 21 are considered as an integral whole, and a displacement of the objective lens 34 with respect to the sledge 10 will simply be indicated as a displacement of the lens actuator 21. Further, unless specifically mentioned otherwise, the wording "the actuator" will indicate the lens actuator 21.

Figure 2A:
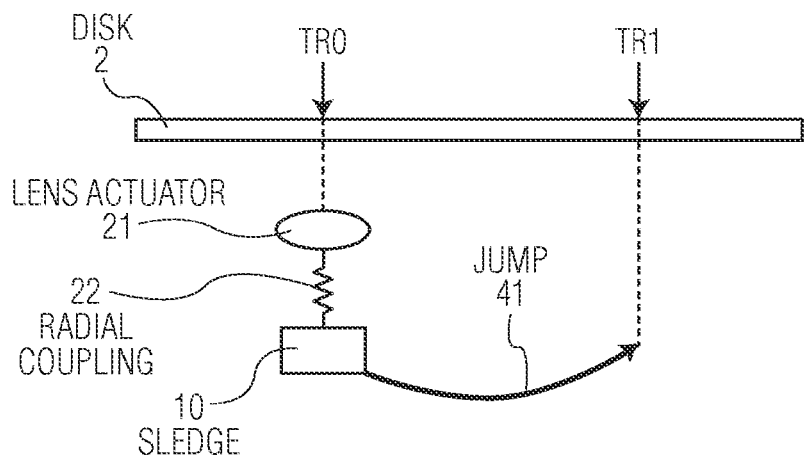
Figure 2B:
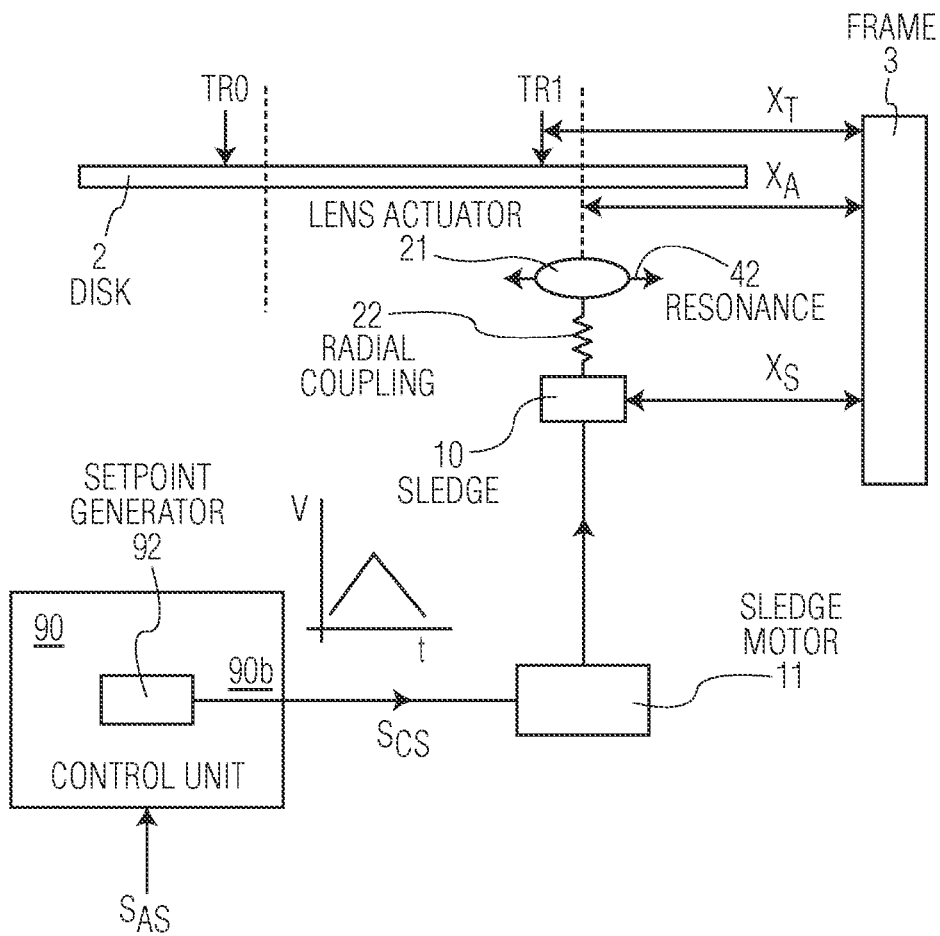

FIG. 2 illustrates a problem encountered during high-speed access, i.e. a jump 41 from a current track TR0 to a target track TR1. The control unit 90 comprises a setpoint generator 92 calculating an optimum trajectory for the sledge 10 in terms of position, speed and acceleration, and generating a corresponding motor control signal $S_{CS}$ for the sledge motor 11, which displaces the sledge 10 carrying the actuator 21. A first part of the problem is that the actuator 21, due to its inertia, can not accurately follow the displacement of the sledge 10, i.e. during acceleration it will lag and during deceleration it will overshoot, while further the actuator 21 tends to resonate with respect to the sledge 10, as indicated by arrows 42 in part B of FIG. 2, which illustrates the arrival of sledge 10 at the calculated position. A second part of the problem is that, by the time sledge 10 arrives at the calculated position, target track TR1 may be displaced with respect to the calculated position, due to for instance eccentricity.

In order to overcome the first part of the problem, the present invention proposes to dampen the movement of the actuator 21 with respect to the sledge 10. To this end, control of the actuator 21 is at least partly based on an actuator deviation signal $S_{AS}$ which represents the difference between actuator position $X_A$ and sledge position $X_S$. Herein, $X_A$ indicates actuator position with respect to the frame 3, and $X_S$ indicates sledge position with respect to the frame 3, as illustrated in FIG. 2.

Figure 3A:
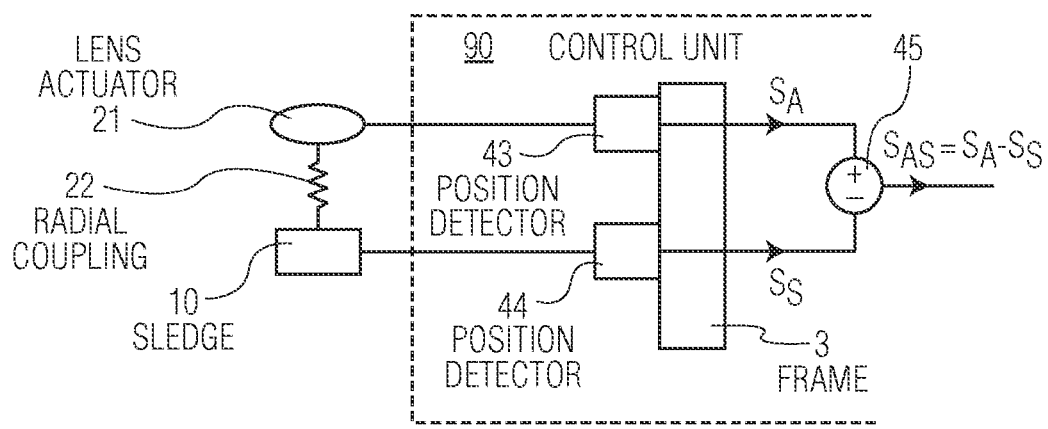
FIGS. 3A-3C illustrate different methods for generating an actuator deviation signal.
Figure 3B:
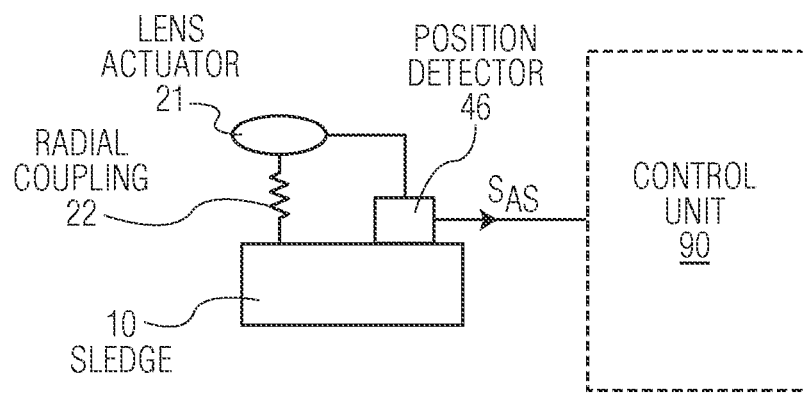
Figure 3C:
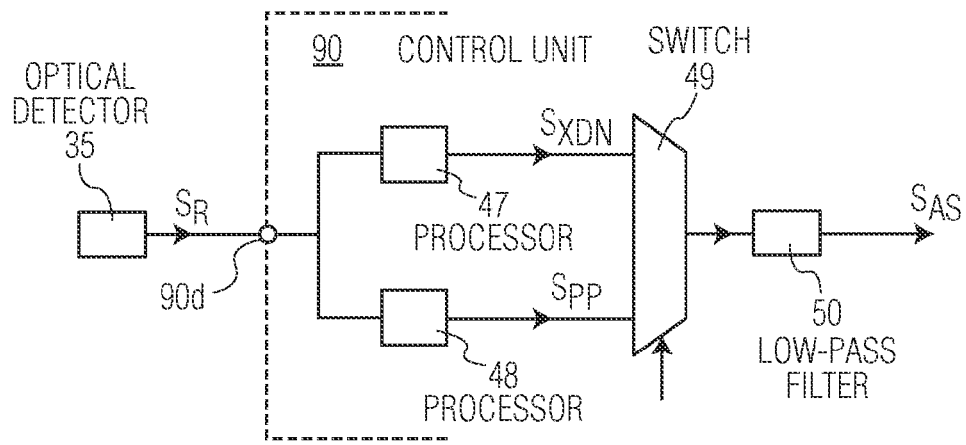

FIGS. 3A-3C illustrate different methods for generating such actuator deviation signal $S_{AS}$. For instance, as illustrated in FIG. 3A, it is possible to have a separate detector 43 sensing the position of actuator 21 with respect to the frame 3, which detector 43 generates a measuring signal $S_A$ representing the actuator position. Another detector 44 senses the position of sledge 10 with respect to the frame 3, and generates a measuring signal $S_S$ representing the sledge position. In a subtractor 45, which may be part of the control unit 90, these measuring signals $S_A$ and $S_S$ are subtracting to provide actuator deviation signal $S_{AS}=S_A-S_S$.

It is noted that the control unit 90 may already be provided with such a sledge position detector 44, used in generating the sledge motor drive signal $S_{CS}$.

Alternatively, it is possible to have a separate detector 46 directly sensing the position of actuator 21 with respect to the sledge 10, which detector 43 directly generates the actuator deviation signal $S_{AS}$ as output signal.

In a preferred embodiment, the present invention avoids the need of an additional position detector. Surprisingly, it has appeared possible to process the optical read signal $S_R$ such as to derive a signal component which is proportional to the radial displacement of the actuator 21 with respect to the light beam 32, i.e. the displacement of the actuator 21 with respect to the sledge 10. As illustrated in FIG. 3C, the control unit 90 has a read signal input 90d for receiving the read signal $S_R$ from the optical detector 35, and comprises a first processing circuit 47 for receiving the optical read signal $S_R$ and for generating an X-error signal $S_{XDN}$ known in the art as XDN signal. The XDN signal can be derived from the signals coming from satellite spots and the central spot in a 3 spot optical system. The XDN signal is generated by adding the signals from the satellite spots, multiplying the resulting signal with a weigh factor and subsequently adding this weighted signal to the signal of the central spot. The value of the weigh factor is such that the weighted signal has an amplitude substantially equal to the amplitude of the signal coming from the central spot. The XDN signal seems to have a good correlation with the radial displacement of the actuator 21 with respect to the sledge 10. As also illustrated in FIG. 3C, the control unit 90 comprises a second processing circuit 48 for receiving the optical read signal $S_R$ and for generating an X-error signal $S_{PP}$ known in the art as one-spot push-pull signal.

It is possible that the control unit 90 only comprises either a processing circuit 47 for generating an XDN signal $S_{XDN}$ or a processing circuit 48 for generating an one-spot push-pull signal $S_{PP}$. In such case, however, the control unit 90 can only be used in devices where an XDN signal $S_{XDN}$ can be derived from the optical read signal $S_R$, or in devices where an an X-error signal $S_{PP}$ can be derived from the optical read signal $S_R$, respectively. In the preferred embodiment illustrated in FIG. 3C, the control unit 90 comprises the first processing circuit 47 as well as the second processing circuit 48, and further comprises a controllable switch 49 having two inputs connected to respective outputs of the two processing circuits 47, 48 for selectively passing one of the two output signals $S_{XDN}$ or $S_{PP}$ to its output.

Figure 4:
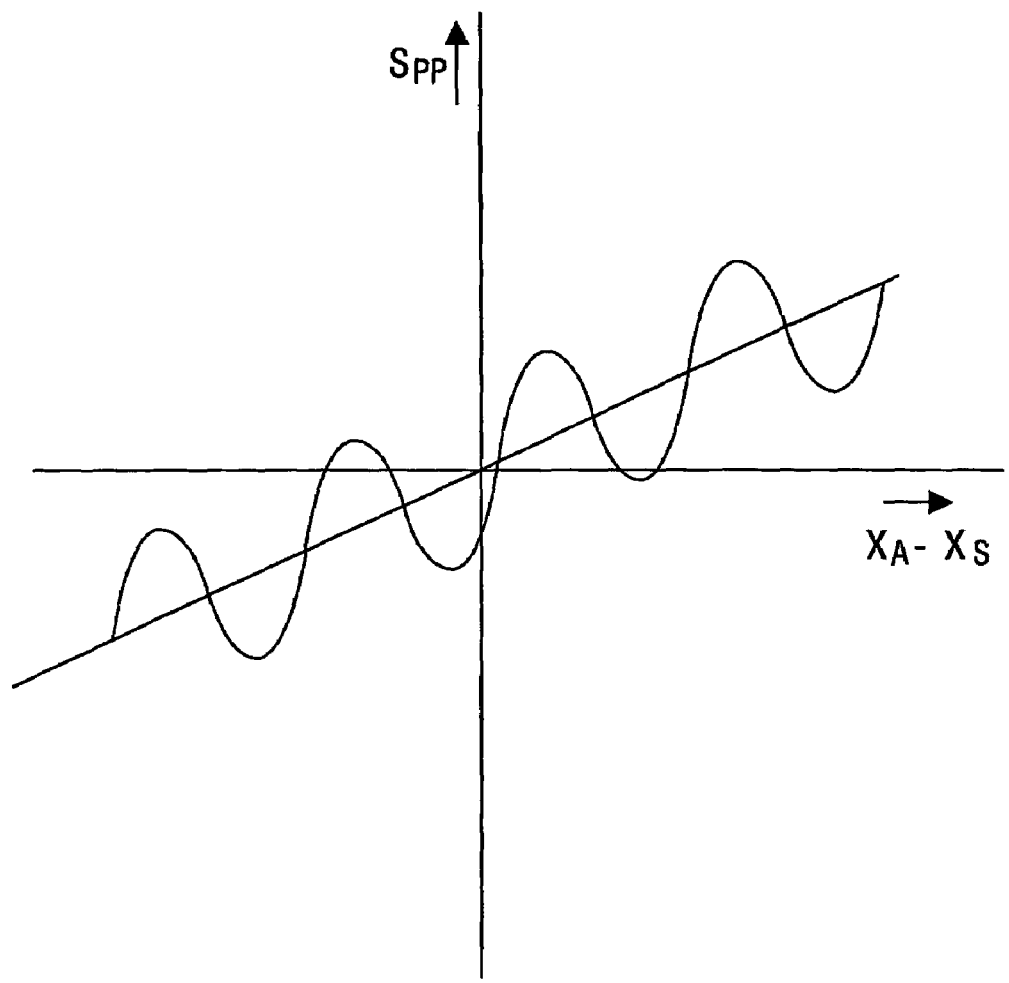
FIG. 4 is a graph illustrating a one-spot push-pull signal.

The control unit 90 is designed to control the controllable switch 49 on the basis of, for instance, the type of disc 2. For instance, as will be clear to a person skilled in the art, the XDN signal $S_{XDN}$ is not available in case of DVD-ROM or CD-ROM. In those cases, the one-spot push-pull signal $S_{PP}$ remains available. FIG. 4 is a graph illustrating the shape of the one-spot push-pull signal during a jump. In this graph, the vertical axis represents signal magnitude while the horizontal axis represents displacement of the actuator 21 with respect to the disc 2. As illustrated, the one-spot push-pull signal is a substantially sine-shaped signal having a sloping DC level, i.e. it can be considered as a superposition of a substantially sine-shaped signal and a substantially linear signal. Each period of this sine-shaped signal corresponds to a track-crossing by the light beam 32b. Said substantially linear signal is proportional to a displacement of the actuator 21 with respect to the detector 35.

Ideally, the XDN signal $S_{XDN}$ is a linear signal corresponding to the linear signal component of the one-spot push-pull signal $S_{PP}$ discussed above. In practice, however, the XDN signal $S_{XDN}$ also contains a modulation corresponding to track crossings, but less strongly than the one-spot push-pull signal $S_{PP}$.

For removing the modulation, the control unit 90 comprises a low-pass filter 50 receiving the output signal from said controllable switch 49, and providing at its output said actuator deviation signal $S_{AS}$.

It is noted that processing circuits for deriving, from the optical read signal $S_R$, the XDN signal $S_{XDN}$ or the one-spot push-pull signal $S_{PP}$ are known per se, and such known processing circuits can be used in practicing the present invention. Therefore, a more detailed description and explanation of the XDN signal $S_{XDN}$ and the one-spot push-pull signal $S_{PP}$ and of such processing circuits for generating these signals will be omitted here.

Figure 5:
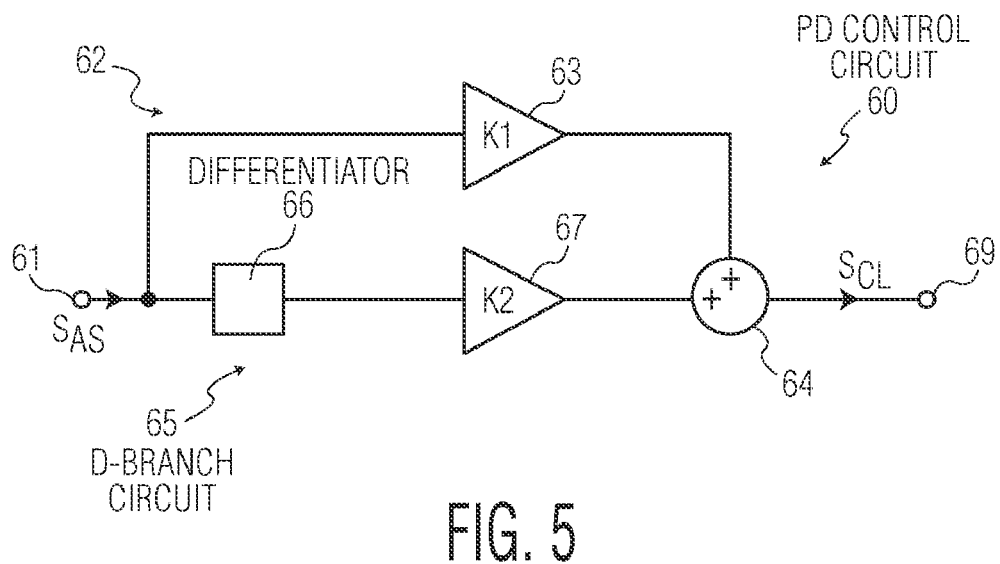
FIG. 5 is a block diagram schematically illustrating a first embodiment of a control circuit.

According to the present invention, the actuator 21 is preferably controlled by a PD control circuit, partly generating the actuator control signal $S_{CL}$ proportional to the difference between actuator position $X_A$ and sledge position $X_S$, i.e. proportional to the actuator deviation signal $S_{AS}$, and partly generating the actuator control signal $S_{CL}$ proportional to the velocity of the actuator 21 with respect to the sledge 10 to dampen the actuator movements. FIG. 5 is a block diagram illustrating an embodiment of a PD control circuit 60 suitable to implement such control.

The PD control circuit 60 has an input 61 receiving the actuator deviation signal $S_{AS}$, and an output 69 providing the actuator control signal $S_{CL}$. This output 69 may be connected to the output 90c of control unit 90. The PD control circuit 60 has a P-branch 62 for generating the proportional part of the actuator control signal $S_{CL}$. This P-branch 62 transfers the actuator deviation signal $S_{AS}$ to a first input of a first adder 64, having its output connected to the circuit output 69. Preferably, and as shown, a first amplifier 63 is provided in the P-branch 62 in order to introduce a predetermined gain factor K1. Preferably, this amplifier 63 is an adjustable amplifier.

The PD control circuit 60 also has a D-branch 65 for generating a differential part of the actuator control signal $S_{CL}$. The D-branch 65 comprises a differentiating circuit 66 differentiating the actuator deviation signal $S_{AS}$, i.e. providing an output signal proportional to the velocity of the actuator 21 with respect to the sledge 10, which output signal is transferred to a second input of a first adder 64. Preferably, and as shown, the PD control circuit 60 comprises a second amplifier 67 between differentiating circuit 66 and first adder 64, in order to introduce a second predetermined gain factor K2. Preferably, this amplifier 63 also is an adjustable amplifier.

Figure 6:
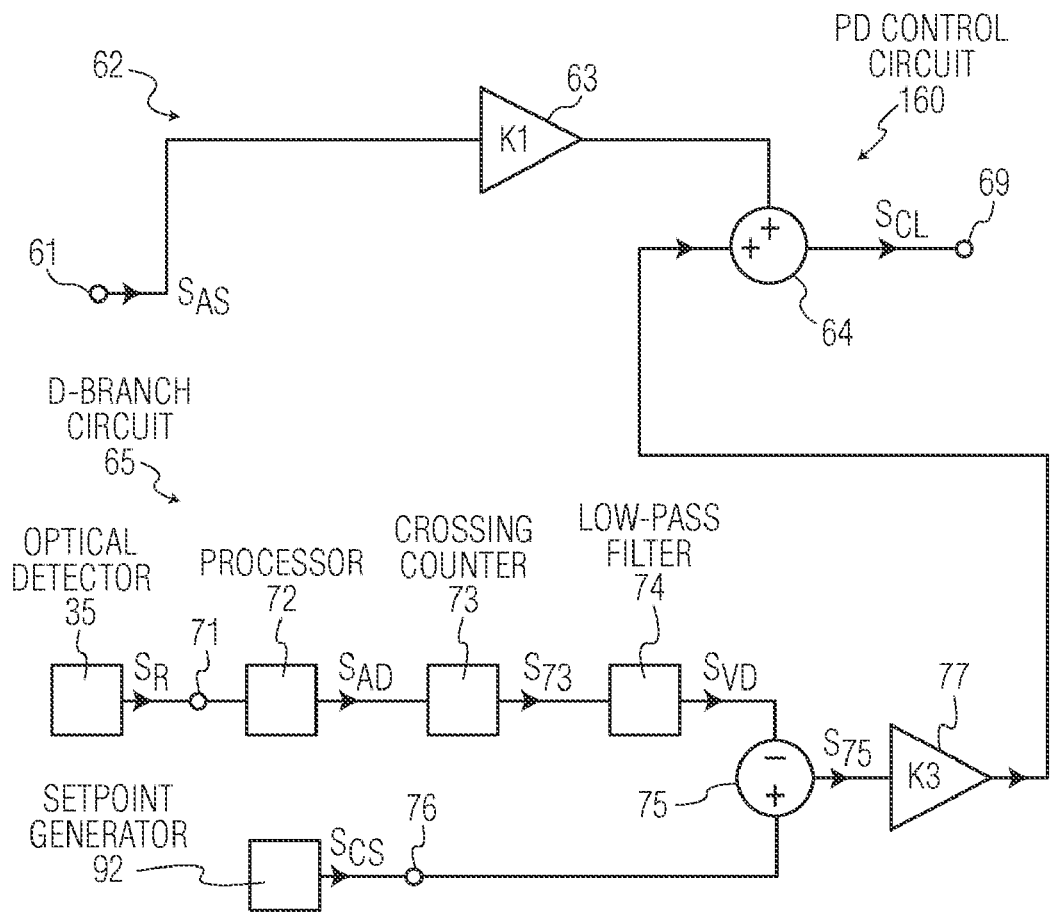
FIG. 6 is a block diagram schematically illustrating a second embodiment of a control circuit.

FIG. 6 is a block diagram illustrating a second embodiment of a PD control circuit 160 suitable to implement such control. In this second embodiment, the P-branch 62 is identical to the P-branch discussed above with reference to the first embodiment 60, but the part of the actuator control signal $S_{CL}$ proportional to the velocity of the actuator 21 with respect to the sledge 10 is generated in a different manner.

The PD control circuit 160 has a second input 71 receiving the optical read signal $S_R$, for instance connected to input 90d of the control unit 90. A processing device 72 is connected to second input 71, and processes the optical read signal $S_R$ for generating a signal $S_{AD}$ indicating the displacement of the actuator 21 with respect to tracks of the disc 2. This signal $S_{AD}$ is sine-shaped, a zero-crossing of this sine-shape corresponding to a track-crossing. A crossing counter 73 counts the zero-crossings of this signal $S_{AD}$, and generates an output signal S73 representing the number of zero-crossings per unit time, i.e. proportional to velocity. A low pass filter 74 smoothens this output signal S73, and provides a smoothened velocity signal $S_{VD}$ indicating the velocity of the actuator 21 with respect to the disc 2.

The PD control circuit 160 has a third input 76 receiving the sledge motor drive signal $S_{CS}$ from the setpoint generator 92, which is fed forward to a non-inverting input of a subtractor 75. Said smoothened velocity signal $S_{VD}$ is supplied to an inverting input of this subtractor 75. The subtractor 75 provides an output signal S75 proportional to the velocity of the sledge 10 and inversely proportional to the velocity of the actuator 21, which output signal is transferred to the second input of the first adder 64. Preferably, and as shown, the PD control circuit 160 comprises a third amplifier 77 between subtractor 75 and first adder 64, in order to introduce a third predetermined gain factor K3. Preferably, this amplifier 77 also is an adjustable amplifier.

The second embodiment of PD control circuit 160 can be used in cases where the optical read signal $S_R$ has clear zero-crossings corresponding to track-crossings, such as for instance in the case of CD-ROM or DVD-ROM, or in case of a written portion of a CD-RW or DVD-RW or DVD+RW. The first embodiment of PD control circuit 60 can also be used in cases where the optical read signal $S_R$ does not have clear zero-crossings, such as for instance when the track-modulation is only weak, such as for instance in the case of X-error signal XDN.

Figure 7:
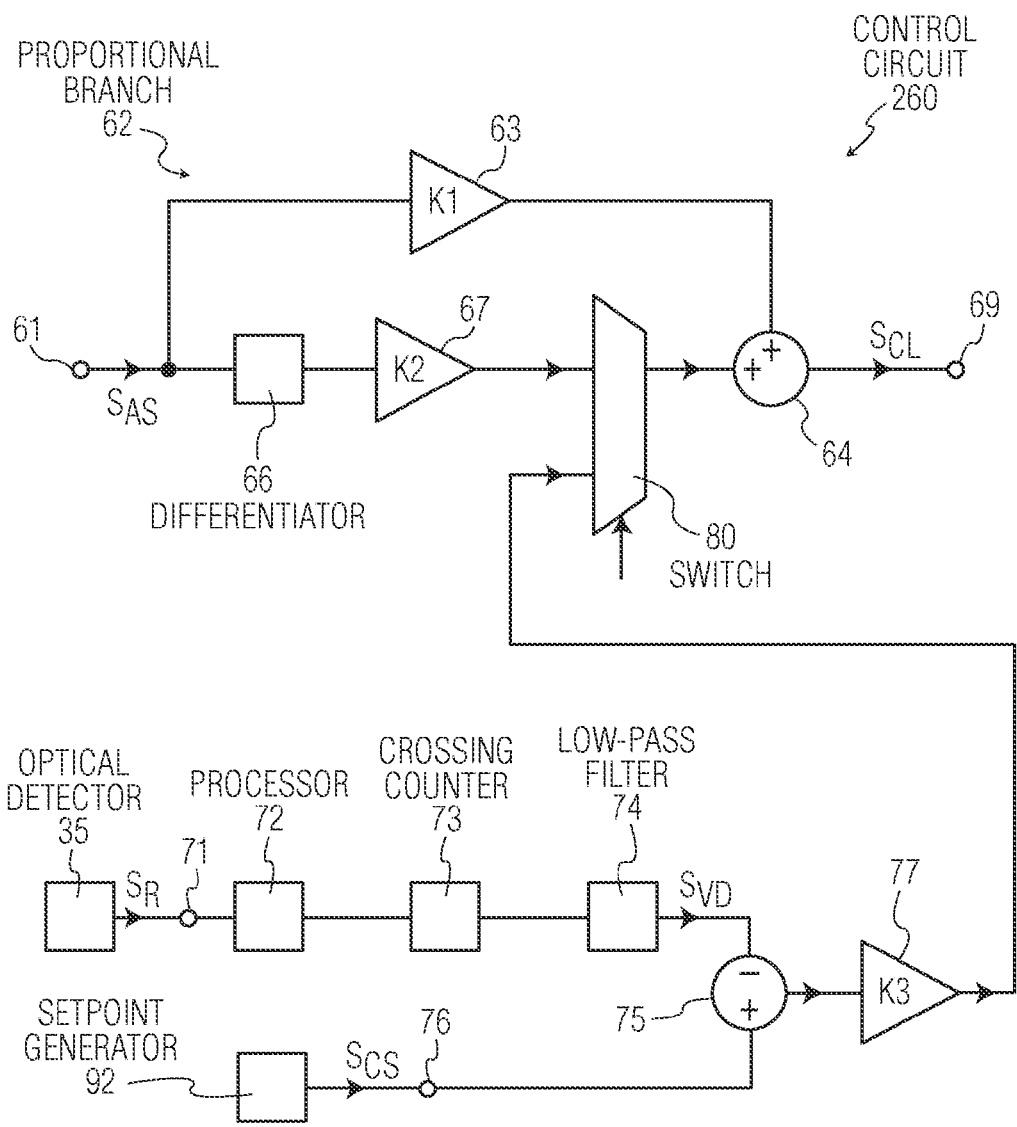
FIG. 7 is a block diagram schematically illustrating a third embodiment of a control circuit.

It is possible that the control unit 90 only comprises either the first PD control circuit 60 or the second PD control circuit 160. In the preferred embodiment illustrated in FIG. 7, however, the control unit 90 comprises a PD control circuit 260 which is a combination of both first and second control circuits 60, 160. A second controllable switch 80 has a first input connected to the output of second amplifier 67, and a second input connected to the output of third amplifier 77, whereas its output is connected to an input of the adder 64. The control unit 90 is designed to control this second controllable switch 80 to either use the differential control of FIG. 5 or the differential control of FIG. 6. Thus, the control unit 90 is capable of operating in one operative mode where control is based on the D-branch 65 of first control circuit 60, in which case movements of the actuator 21 are dampened with respect to the sledge 10, or operating in a second operative mode where control is based on the velocity signal $S_{VD}$ derived from counting track crossings, in which case movements of the actuator 21 are dampened with respect to the disc 2.

As described above with reference to FIG. 2, a second part of the problem is that the tracks may have shifted from the location they had at the moment when the jump was initiated (FIG. 2, at A), due to for instance imperfect shape of the tracks and/or imperfect alignment of the tracks with respect to the rotational axis 5 of the disc 2. In such case, it appears that the jump has terminated at the wrong track, a new jump must be calculated (retry).

In order to prevent such retries, the present invention provides a further improvement. The control unit 90 is provided with a memory 310 containing information on the shape of the tracks of the disc 2. This memory 310 will also be referred to as shape memory. During "normal" operation, i.e. track-following operation, the actuator 21 is driven to follow a track, so that the actuator 21 makes such movements with respect to the sledge 10 as necessary to stay on track. Consequently, in this mode, the actuator drive signal $S_{CL}$ generated by the control unit 90 is representative for the shape of the tracks with respect to a stationary sledge. The control unit 90 is designed to store into said shape memory 310 this actuator drive signal $S_{CL}$, or a track shape signal $S_{TF}$ derived from said actuator drive signal $S_{CL}$, such as for instance an average over a predetermined number of tracks, for instance 10. During a jump, the control unit 90 uses the information in said shape memory 310 when generating said actuator drive signal $S_{CL}$.

Figure 8:
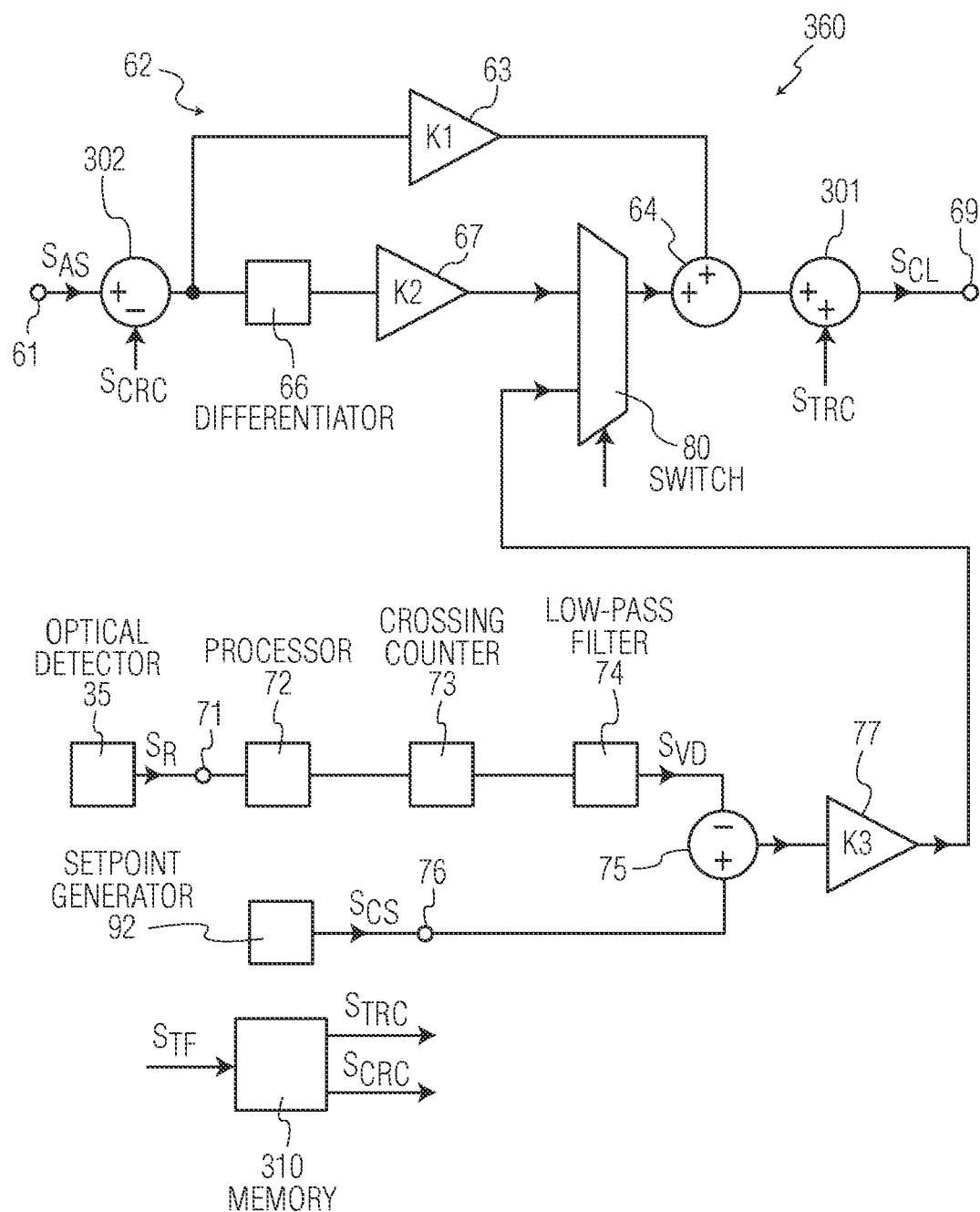
FIG. 8 is a block diagram schematically illustrating a fourth embodiment of a control circuit.

FIG. 8 illustrates a preferred embodiment 360 of the PD control circuit, based on the third embodiment 260, and comprising, in addition to the third embodiment 260, said memory 310, a tracking repetitive control adder 301, and a compensating repetitive control subtractor 302. The tracking repetitive control adder 301 is arranged between the output of adder 64 and the output 69 of the PD control circuit 360. The tracking repetitive control adder 301 has one input receiving the output signal of the adder 64.

The control unit is designed to generate, on the basis of the information in said shape memory 310, a tracking repetitive control signal $S_{TRC}$. This tracking repetitive control signal $S_{TRC}$ is supplied to another input of the tracking repetitive control adder 301. Consequently, the actuator 21 is not being held firmly stationary with respect to the sledge 10, but the lens is made to perform a calculated oscillatory movement with respect to a reference position which is held firmly stationary with respect to the sledge position, this oscillatory movement corresponding to track movement with respect to the sledge. Thus, when the jump has terminated, the probability that the actuator 21 has actually arrived at the desired track has increased.

The above-described operation, based on supplying the tracking repetitive control signal $S_{TRC}$ to the tracking repetitive control adder 301, is adequate in case of the second embodiment of control circuit 160, or if, in the third embodiment 260, the control unit 90 is operating in said second operative mode. However, in case of the first embodiment of control circuit 60, or if, in the third embodiment 260, the control unit 90 is operating in said first operative mode, the control circuit would be operative to dampen all movements of the actuator 21 with respect to the sledge 10, effectively counter-acting any affect of the tracking repetitive control $S_{TRC}$. In order to avoid this, the actuator deviation signal $S_{AS}$ as provided at the input 61 of control circuit 360 is modified to allow said calculated oscillatory movement of the actuator 21 with respect to the sledge 10.

To this end, the compensating repetitive control subtractor 302 has a non-inverting input connected to input 61, and the P-branch 62 and the D-branch 65 have their inputs connected to the output of the compensating repetitive control adder 302. The control unit 90 is designed to generate, on the basis of the information in said shape memory 310, a compensating repetitive control signal $S_{CRC}$, which is supplied to an inverting input of the tracking repetitive control subtractor 302.

It is noted that the compensating repetitive control signal $S_{CRC}$ is identical to the tracking repetitive control $S_{TRC}$, except for a proportionality factor.

It should be clear to a person skilled in the art that the present invention is not limited to the exemplary embodiments discussed above, but that various variations and modifications are possible within the protective scope of the invention as defined in the appending claims.

For instance, the present invention can be practiced in hardware as well as in software.

Further, within the context of the present invention, it is possible to derive an actuator deviation signal $S_{AS}$ from other sources. For instance, in a case where the actuator 21 comprises an electromagnetic device, a displacement of the actuator 21 with respect to the sledge 10 will induce a back-EMF in such electromagnetic device; such back-EMF is perfectly suitable to be received by the control unit 90 in order to be used as actuator deviation signal $S_{AS}$. Thus, although the present invention has been explained with reference to an exemplary embodiment wherein the actuator deviation signal $S_{AS}$ is derived from the optical read signal $S_R$, it should be clear that such explanation is not intended to restrict the present invention to such embodiment.

The invention claimed is:

1. Disc drive apparatus for optical discs, comprising:
a frame;
a sledge displaceably mounted with respect to said frame;
a lens actuator displaceably mounted with respect to said sledge;
a control unit for generating a control signal (SCL) received by the lens actuator;
wherein the control unit is designed, during a jump operation, to continuously generate said control signal (SCL) for the lens actuator at least partly on the basis of an actuator deviation signal (SAS) representing a difference between actuator position (XA) and sledge position (XS) irrespective of a position of the lens actuator with respect to an optical disk.

2. The apparatus according to claim 1, wherein said control unit comprises a control circuit having an input receiving said actuator deviation signal (SAS) and having an output providing said lens actuator control signal (SCL);
the control circuit comprising a proportional branch generating a control signal contribution proportional to said actuator deviation signal (SAS).

3. The apparatus according to claim 2, wherein said control circuit further comprises:
an adder having an output connected to said circuit output;
a first amplifier having an input coupled to said circuit input and having an output coupled to an input of said adder.

4. The apparatus according to claim 3, wherein said control circuit further comprises:
a differentiating circuit having an input coupled to said circuit input;
a second amplifier having an input coupled to an output of said differentiating circuit and having an output coupled to an input of said adder.

5. The apparatus according to claim 4, wherein said control circuit further comprises:
a second controllable switch having a first input coupled to the output of second amplifier, having a second input coupled to the output of said subtractor or said third amplifier, respectively, and having an output coupled to an input of said adder.

6. The apparatus according to claim 3, further comprising:
an optical detector generating an optical read signal (SR);
a setpoint generator generating a sledge motor drive signal (SCS);
wherein said control circuit further comprises:
processing means having an input coupled to receive said read signal (SR), and designed to process the optical read signal (SR) for generating an actuator displacement signal (SAD) indicating the displacement of the actuator with respect to tracks of the disc;
a zero-crossings counter having an input coupled to an output of said processing means, and designed to generate an output signal representing the number of zero-crossings per unit time;
a low-pass filter having an input coupled to an output of said zero-crossings counter;
a subtractor having an inverting input coupled to an output of said low-pass filter, having a non-inverting input coupled to receive said sledge motor drive signal (SCS), and having an output coupled to an input of said adder.

7. The apparatus according to claim 6, wherein said control circuit further comprises a third amplifier having an input coupled to an output of said subtractor and having an output coupled to an input of said adder.

8. The apparatus according to claim 2, wherein said control unit is designed, in a jump mode, to generate its actuator control signal (SCL) such as to cause an oscillating movement of the lens actuator corresponding to a track shape.

9. The apparatus according to claim 2, wherein said control unit comprises a shape memory containing track shape information, and wherein the control unit, in a jump mode, is designed to read track shape information from said shape memory and to generate a tracking repetitive control signal (STRC) on the basis of the track shape information in said shape memory;
wherein said control circuit further comprises:
a tracking repetitive control adder having an input coupled to an output of said first adder, having another input coupled to receive said tracking repetitive control signal (STRC), and having an output coupled to said circuit output.

10. The apparatus according to claim 9, wherein the control unit, in a jump mode, is designed to read track shape information from said shape memory and to generate a compensating repetitive control signal (SCRC) on the basis of the track shape information in said shape memory;
wherein said control circuit further comprises:

a tracking repetitive control subtractor, having a non-inverting input coupled to said circuit input, having an inverting input coupled to receive said compensating repetitive control signal (SCRC), and having an output coupled to the input end of said proportional branch.

11. The apparatus according to claim 9, wherein the control unit is designed to write track shape information into said shape memory when the control unit is in a track following mode.

12. Method for controlling a lens actuator during a jump, wherein a control signal (SCL) received by said lens actuator is continuously generated at least partly on the basis of an actuator deviation signal (SAS) representing a difference between actuator position (XA) and a sledge position (XS) irrespective of a position of the lens actuator with respect to an optical disk.

* * * * *